United States Patent
Miet et al.

[11] Patent Number: 6,138,094
[45] Date of Patent: Oct. 24, 2000

[54] SPEECH RECOGNITION METHOD AND SYSTEM IN WHICH SAID METHOD IS IMPLEMENTED

[75] Inventors: Gilles Miet; Benoît Guilhaumon, both of Le Mans, France

[73] Assignee: U.S. Philips Corporation, New York, N.Y.

[21] Appl. No.: 09/014,172

[22] Filed: Jan. 27, 1998

[30] Foreign Application Priority Data

Feb. 3, 1997 [FR] France .................................. 9701170

[51] Int. Cl.$^7$ .................................................. G10L 15/10
[52] U.S. Cl. ........................... 704/233; 704/238; 704/251
[58] Field of Search ................................. 704/231, 233, 704/238, 241, 251, 253, 254, 255, 226

[56] References Cited

U.S. PATENT DOCUMENTS

| | | | |
|---|---|---|---|
| 4,239,936 | 12/1980 | Sakoe ..................................... | 179/1 SD |
| 4,610,023 | 9/1986 | Noso et al. ............................. | 704/233 |
| 4,918,732 | 4/1990 | Gerson et al. ......................... | 704/233 |
| 4,933,973 | 6/1990 | Porter ..................................... | 704/233 |
| 4,952,931 | 8/1990 | Serageldin et al. .................... | 340/902 |
| 5,212,764 | 5/1993 | Ariyoshi ................................. | 704/233 |
| 5,459,814 | 10/1995 | Gupta et al. ............................ | 704/233 |
| 5,526,466 | 6/1996 | Takizawa ................................ | 704/233 |
| 5,649,055 | 7/1997 | Gupta et al. ............................ | 704/233 |
| 5,761,639 | 6/1998 | Takebayashi et al. .................. | 704/253 |
| 5,854,999 | 12/1998 | Hirayama ............................... | 704/226 |

FOREIGN PATENT DOCUMENTS

| | | | |
|---|---|---|---|
| 0750292 A2 | 12/1996 | European Pat. Off. .......... | G10L 5/06 |
| 1321499A | 12/1989 | Japan .............................. | G10L 3/00 |
| 63155282 | 12/1989 | Japan .............................. | G10L 3/00 |
| 2176796A | 7/1990 | Japan .............................. | G10L 3/00 |
| 63332078 | 7/1990 | Japan .............................. | G10L 3/00 |
| 3138698A | 6/1991 | Japan .............................. | G10L 3/00 |
| 64275942 | 6/1991 | Japan .............................. | G10L 3/00 |
| 3160438 | 1/1993 | Japan .............................. | G10L 3/00 |
| 511795A | 1/1993 | Japan .............................. | G10L 3/00 |
| 462886 | 10/1993 | Japan .............................. | G10L 3/02 |
| 5265484A | 10/1993 | Japan .............................. | G10L 3/02 |

*Primary Examiner*—Richemond Dorvil
*Assistant Examiner*—Abul K. Azad
*Attorney, Agent, or Firm*—Jack D. Slobod

[57] ABSTRACT

In a speech recognition method and system a spoken word to be recognized is broken down into input vectors (K2$a$), ambient noise is evaluated (K1), a recognized word is chosen from a dictionary having associated reference vectors which are separated from the input vectors by a shortest distance (K3), and the recognized word is validated by a comparison of this distance with a threshold value which is derived as a function of the result of the evaluation of ambient noise. The ambient noise evaluation may be carried out at an instant when the speaker is silent, i.e. either before or after the speaker speaks the word to be recognized.

9 Claims, 3 Drawing Sheets

SPEECH RECOGNITION METHOD AND SYSTEM IN WHICH SAID METHOD IS IMPLEMENTED

BACKGROUND OF THE INVENTION

The present invention relates to a method of recognizing spoken words, according to which method words are put in a dictionary in the form of vectors, the method comprising the following steps:
breakdown of the word to be recognized into input vectors,
evaluation of ambient noise,
choice of the word to be recognized from the words of the dictionary while said noise evaluation step is taken into account, via a choice of the dictionary word of which the distance that separates its input vectors from the reference vectors is the smallest, and
validation of the word to be recognized by a comparison of said distance with a threshold value.

The invention also relates to a system in which the method is applied, notably a wireless telephony device for cellular radiophone networks for which the hardware resources, memories and processors are on the whole assigned in limited manner. Such a method is described in European patent EP 0 750 292. According to this known method, the noise is estimated and all the vectors of the input signal and the vectors of the reference signals are modified as a function of this noise level into other vectors.

This known method is not very applicable to small-size devices in which the hardware resources are limited, notably the memory. Furthermore, these updates of the reference vectors take time causing delay which is annoying to the user of small devices.

OBJECTS AND SUMMARY OF THE INVENTION

The present invention proposes a method of the type described above which provides good performance as regards the recognition of speech in a noisy environment, while only very little of the hardware resources, notably the memory is used.

Therefore, such a method of the type defined in the opening paragraph is characterized in that it comprises at least the following step:
modification of the threshold value as a function of the result of the evaluation of ambient noise.

The idea of the invention is based on the fact that when a person is in a silent environment, the recognition of speech is to take place with a low threshold, because the conditions are all right. When the environment becomes noisy, a more tolerant threshold is to be provided, because the noise degrades the input vectors.

These and other aspects of the invention will be apparent from and elucidated with reference to the embodiments described hereinafter.

DETAILED DESCRIPTION OF THE PREFERRED EMBODIMENT

Figure 1:
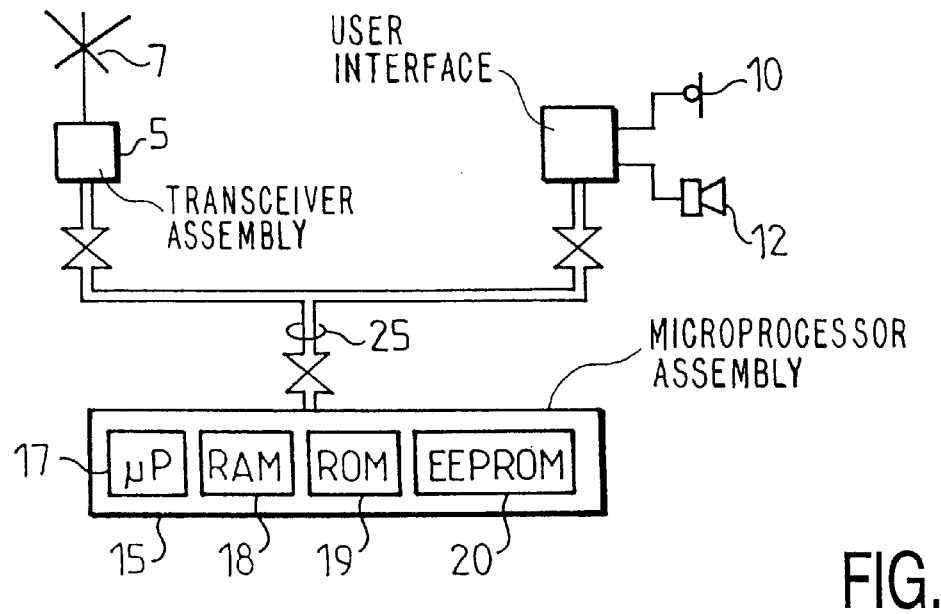
FIG. 1 shows a device according to the invention.

In FIG. 1, the device in which the method may be used is a cellular telephony device of the GSM terminal type. It is formed by a transceiver assembly 5. A transceiver antenna 7 for receiving and transmitting waves from and to a base station (not shown) is connected to this assembly 5. For the user to exchange remarks with his called parties, a user interface 9 includes a microphone 10 and a loudspeaker 12. This microphone will also be used for applying speech recognition so that the user will be able to give orders and/or manage his telephone directory by calling the known name. The other elements of user interface 9 such as a screen or a keyboard are not represented because they are used little in the invention. The device shown in FIG. 1 has a microprocessor assembly 15 which comprises an actual microprocessor 17, a random-access memory 18 and a read-only memory 19 containing the instructions for implementing the method according to the invention, and an electrically erasable memory 20 for containing the reference vectors which define the vocabulary to be recognized and also to be updated. This microprocessor assembly 15 communicates its information to all the other elements of the device over a common line 25.

Figure 2:
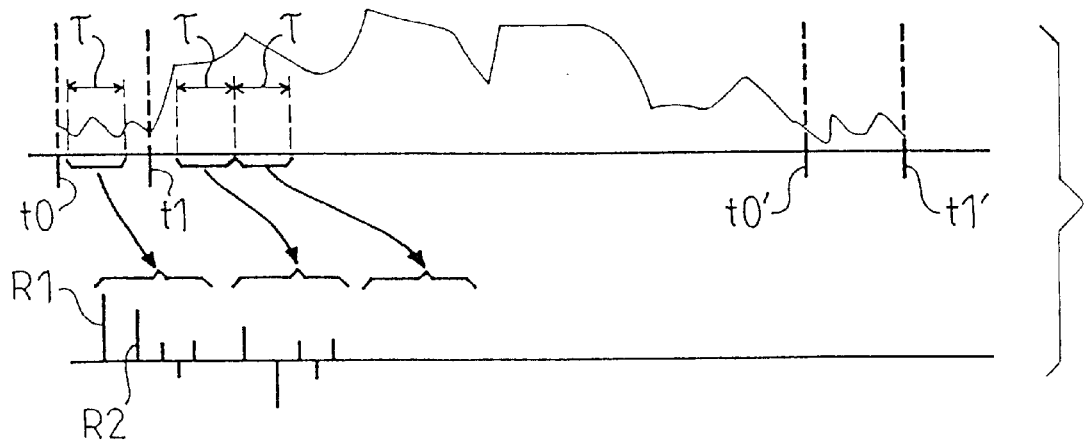
FIG. 2 shows a timing diagram.

FIG. 2 shows a timing diagram which represents the voice signals in A.

According to the usual speech recognition techniques, such as explained in above-mentioned European patent, evolutionary spectrums are determined for these voice signals for a time $\tau$ represented in B in FIG. 2 by the spectral lines R1, R2 . . . . The various lines of this spectrum obtained by fast Fourier transform, for example, constitute vectors. For determining the recognition of a word, these various lines are compared with those established previously which form the dictionary and are stored in the memory 20.

Figure 3:
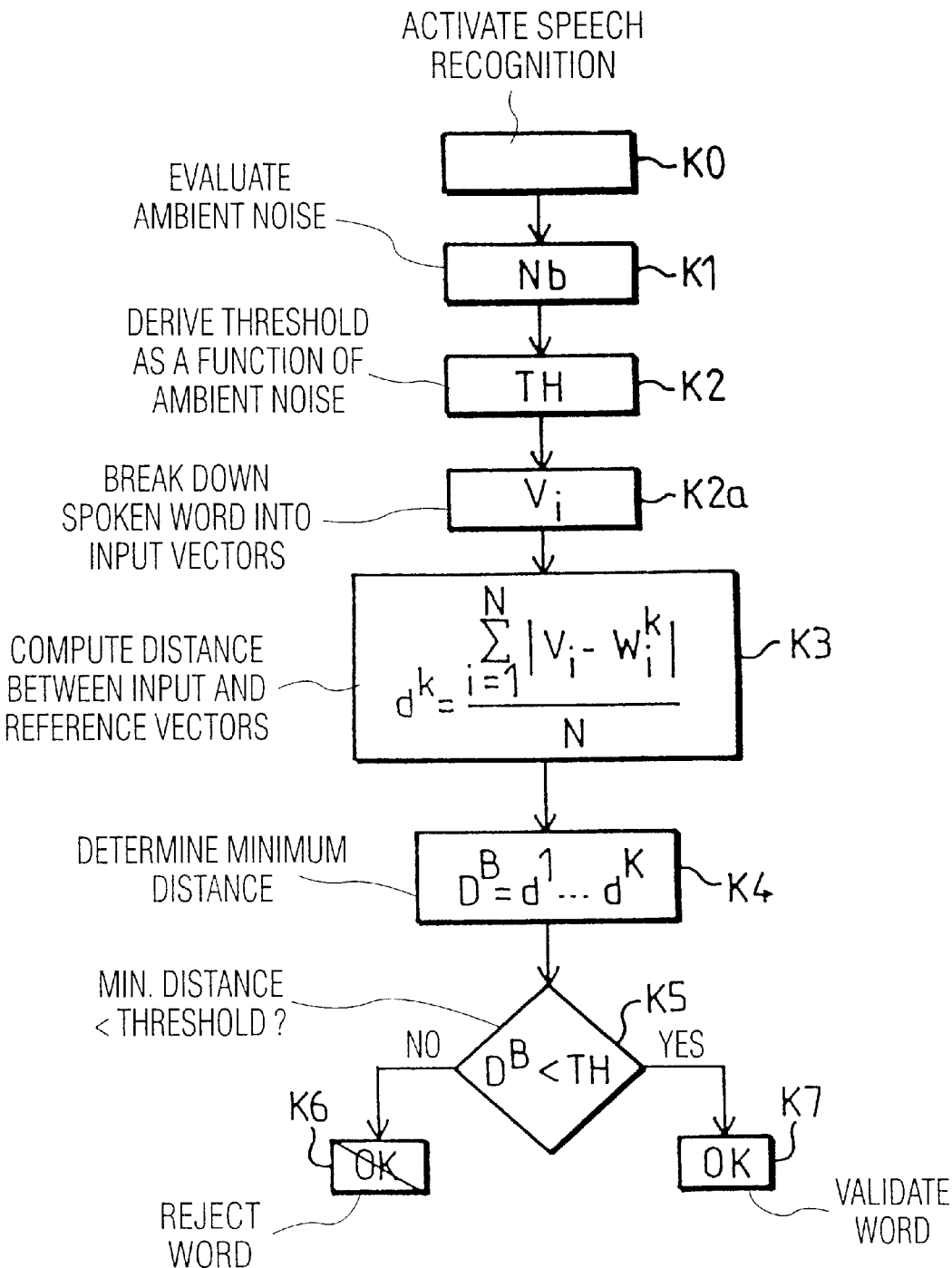
FIG. 3 shows a flow chart explaining the method according to the invention.

FIG. 3 shows the flow chart which explains the method according to the invention.

Box K0 represents the activation of speech recognition; this may be made by validating an item on a menu which appears on the screen of the device.

Figure 4:
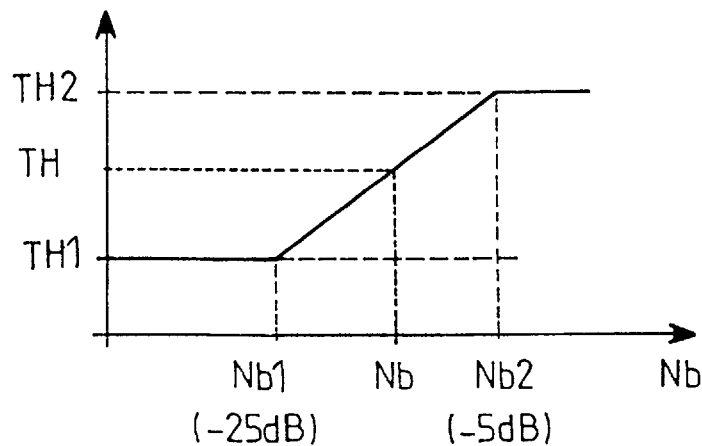
FIG. 4 shows the evolution of the threshold as a function of ambient noise.

Box K1 represents the step of the evaluation of ambient noise. This step is executed between the instants t0 and t1 (see FIG. 2) between which the speaker is supposed not to speak, i.e. before the speaker has spoken the word to be recognized. Supposing Nb is this value which is expressed in dB relative to the maximum level (if one works with 8 bits, this maximum level 0 dB is given by 1111 1111). This measure is taken considering the mean value of the noise vectors, their moduli, or their squares. From this level measured in this manner is derived a threshold TH (box K2) as a function of the curve shown in FIG. 4.

Box K2a represents the breakdown of a spoken word to be recognized into input vectors $V_i$.

Box K3 indicates the computation of the distances $d^k$ between the input vectors $V_i$ and the reference vectors $w^K_i$. This distance is evaluated based on the absolute value of the differences between the components of these vectors. In box K4 is determined the minimum distance $D^B$ among the minimum distances which have been computed. This minimum value is compared with the threshold value TH, box K5. If this value is higher than the threshold TH, the word is rejected in box K6, if not, it is declared recognized in box K7.

Figure 5:
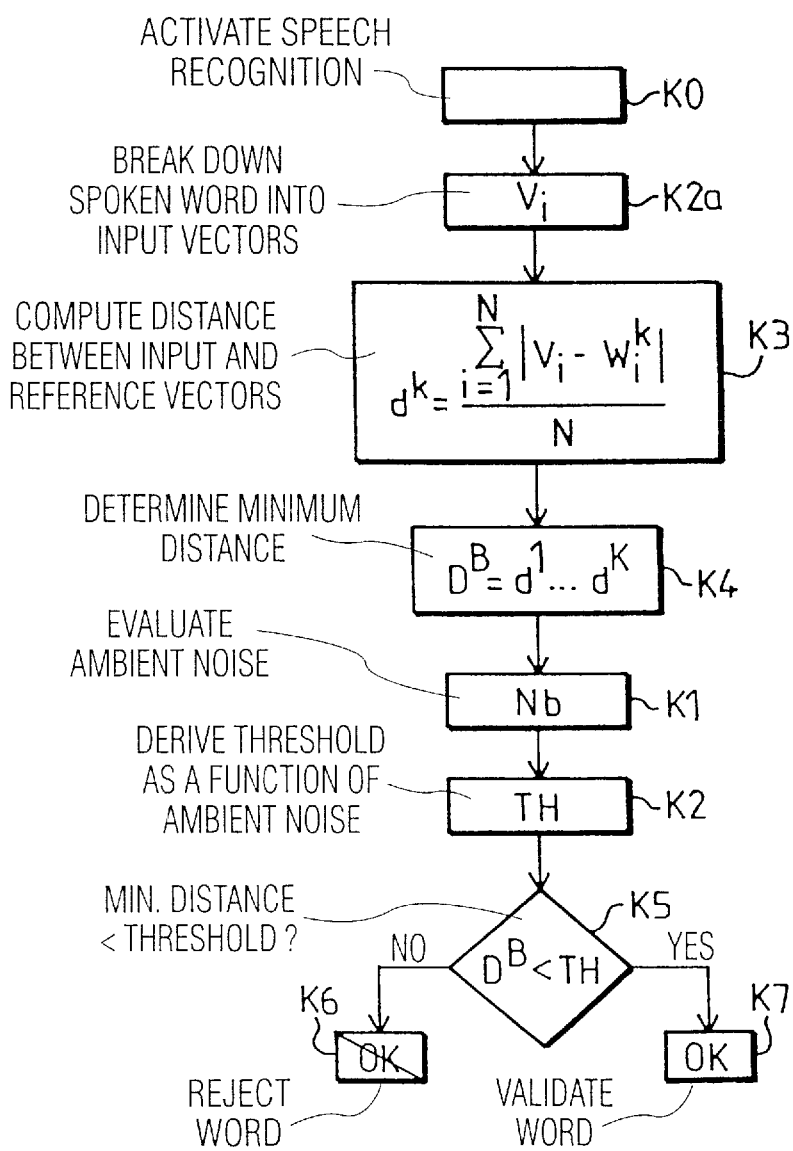
FIG. 5 shows a flow chart explaining a variant of an embodiment of the method according to the invention.

The order of various steps may be reversed in the method according to the invention. As this is shown in FIG. 5, the evaluation of the ambient noise may also be carried out after the speaker has spoken the word to be recognized, that is, between the instants t0' and t1' (see FIG. 2). This is translated in the flow chart of FIG. 5 by the fact that the steps K1 and K2 occur after step K4 and before decision step K5.

The end of this ambient noise evaluation step, according to a characteristic feature of the invention, may be signaled to the speaker in that a beep is emitted, for example, by a loudspeaker 12 which then invites the speaker to speak.

The applicants have taken into account that a substantially linear function of the threshold value as a function of the measured noise level in dB was satisfactory. Other functions may be found too, without leaving the scope of the invention therefore.

If the distances vary between a value from 0 to 100, the values of TH1 may be 10 and those of TH2 80 for noise levels varying from −25 dB to −5 dB.

For the computation of the threshold TH, the noise level (Nb) may be compared with the signal level (Ns) which defines a signal-to-noise ratio SNR (computed signal level based on input vectors: $V_i$).

$$Ns = \frac{1}{N}\sum_{i=1}^{N} v_i^2 - Nb$$

$$Nb = \frac{1}{P}\sum_{i=1}^{P} (B_i)^2$$

where $B_i$ are noise components. SNR (signal-to-noise ratio= Ns/Nb.

The curve giving TH plotted against SNR is the same as TH plotted against Nb.

Also, within the scope of the invention, it is possible to evaluate the noise when the user is speaking, by utilizing autocorrelation methods.

In that case, Nb and Ns are computed on the same step level and TH is evaluated on the basis of SNR.

What is claimed is:

1. A method of recognizing spoken words, utilizing a dictionary containing words and associated reference vectors, the method comprising:

breaking down a spoken word to be recognized into input vectors, evaluating ambient noise measured when the speaker is not speaking, choosing a recognized word from the dictionary having associated reference vectors which are separated from the input vectors by a smallest distance, and validating the recognized word by a comparison of said smallest distance with a threshold value, wherein the threshold value is derived as a function of the result of the evaluation of ambient noise.

2. The method as claimed in claim 1, wherein the evaluation of ambient noise is carried out before the speaker speaks the word to be recognized.

3. The method as claimed in claim 1, wherein the evaluation of ambient noise is carried out after the speaker has spoken the word to be recognized.

4. The method as claimed in claim 1, wherein an invitation-to-speak signal perceptible to the speaker is issued and the evaluation of ambient noise is carried out before this signal is issued.

5. A method as claimed in claim 1, wherein the threshold increases substantially linearly with an increase in the ambient noise level measured in dB.

6. A speech recognition device comprising a user interface including a microphone for capturing words spoken by a user to be recognized, and a microprocessor assembly programmed for carrying out the following acts utilizing a stored dictionary containing words and associated reference vectors:

breaking down a spoken word to be recognized into input vectors, evaluating ambient noise measured when the user is not speaking, choosing a recognized word from the dictionary having associated reference vectors which are separated from the input vectors by a smallest distance, and validating the recognized word by a comparison of said smallest distance with a threshold value, wherein the threshold value is derived as a function of the result of the evaluation of ambient noise.

7. The device as claimed in claim 6, wherein the microprocessor assembly is programmed such that the evaluation of ambient noise is carried out once speech recognition is activated by the user via the user interface.

8. A device as claimed in claim 6, wherein the microprocessor assembly is programmed such that an invitation-to-speak signal perceptible to the user is issued via the user interface and the evaluation of ambient noise is carried out before this signal is issued.

9. A device as claimed in claim 6, wherein said device is a cellular telephone station.

* * * * *